(12) United States Patent
Katano

(10) Patent No.: US 8,182,258 B2
(45) Date of Patent: May 22, 2012

(54) IMPRINTING DEVICE

(75) Inventor: Tomonori Katano, Nagano (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 107 days.

(21) Appl. No.: 12/656,326

(22) Filed: Jan. 26, 2010

(65) Prior Publication Data

US 2010/0196527 A1    Aug. 5, 2010

(30) Foreign Application Priority Data

Feb. 4, 2009    (JP) .................................. 2009-024096

(51) Int. Cl.
*B29C 59/00*    (2006.01)
(52) U.S. Cl. ........ 425/385; 425/810; 264/293; 264/1.33
(58) Field of Classification Search .................. 425/385, 425/810; 264/1.33, 293
See application file for complete search history.

(56) References Cited

U.S. PATENT DOCUMENTS

| | | | | |
|---|---|---|---|---|
| 4,213,927 A | * | 7/1980 | Alberti ........................... | 264/107 |
| 7,343,857 B2 | | 3/2008 | Sakurai et al. | |
| 2004/0149367 A1 | * | 8/2004 | Olsson et al. .................... | 156/64 |
| 2004/0182820 A1 | * | 9/2004 | Motowaki et al. .............. | 216/44 |
| 2006/0115584 A1 | | 6/2006 | Hattori et al. | |
| 2006/0216371 A1 | * | 9/2006 | Homola et al. ............... | 425/408 |
| 2006/0286193 A1 | | 12/2006 | Ando et al. | |

* cited by examiner

*Primary Examiner* — Maria Veronica Ewald
(74) *Attorney, Agent, or Firm* — Manabu Kanesaka

(57) ABSTRACT

An imprinting device has a fixed side pressing structure and a movable side pressing structure that is movable toward and away from the fixed side pressing structure. The fixed side pressing structure includes a fixed base plate, a positioning pin for positioning a fixed stamper and a recording medium substrate, and a fixed stamper support for holding the stamper in place using suction. The movable side pressing structure includes a movable base plate, a positioning pin for positioning a movable stamper, and a movable stamper support for holding the movable stamper in position using suction, electromagnetism or adhesive.

6 Claims, 7 Drawing Sheets

IMPRINTING DEVICE

BACKGROUND OF THE INVENTION AND RELATED ART STATEMENT

The present invention relates to an imprinting device for transferring a predetermined pattern of protrusions and recesses on a transfer target substrate such as a magnetic recording medium.

With increasing recording density of magnetic recording media, some magnetic recording media have been proposed for avoiding a problem of excessive recording referred to as side fringe. An example of this is disclosed in Patent Document 3 (see below). This proposed media include a magnetic recording medium with a discrete track structure having a groove between adjacent recording tracks and a patterned medium with dots each constituting one recording bit on a disk directed to achieving a higher recording density.

Utilization of nano imprinting technology has been proposed for manufacturing the magnetic recording media as disclosed in Patent Document 1 and Patent Document 2 (see below), for example.

An imprinting device for manufacturing magnetic recording media utilizing this nano imprinting technology comprises, as disclosed in Patent Document 2 for example, principal construction elements comprising a press bottom plate with a substrate-mounting surface on which a substrate having a resist film is disposed and a press top plate, which is disposed immediately adjacent to or separated from the press bottom plate with a disk-shaped stamper. This stamper has a pattern of recesses and protrusions to be transferred on its central region. A known example comprises a buffer sheet between a stamper and a press top plate to unify the pressing force.

In manufacturing a discrete track medium or a patterned medium using the above imprinting device construction, an original die of a stamper (or a mould) having a fine pattern of recesses and protrusions formed on a transferring surface thereof, is used for transferring the pattern onto a surface of a magnetic disk substrate using a resist resin coating. Then, an etching process is carried out using the resist film with the transferred pattern of recesses and protrusions as a mask, to provided a magnetic layer on the medium (a magnetic disk) having the pattern of recesses and protrusions.

When the pattern of recesses and protrusions is transferred on one surface of a substrate, the substrate is positioned on a substrate-mounting surface by inserting a positioning cylinder (a positioning pin), provided on the press bottom plate, into a through hole provided in the center of the substrate. When the pattern of recesses and protrusions is transferred onto both surfaces of a substrate, the substrate is placed on a substrate-mounting surface of the press bottom plate with the both surfaces being sandwiched by two stampers. As in the case of transferring to one surface, the substrate is positioned on the substrate mounting surface by inserting a positioning cylinder provided on the press bottom plate into the central through-hole of the substrate.

[Patent Document 1]
Japanese Unexamined Patent Application Publication No. 2006-326927
[Patent Document 2]
Japanese Unexamined Patent Application Publication No. 2005-108351
[Patent Document 3]
Japanese Unexamined Patent Application Publication No. 2005-056535

The printing devices as described above, however, have the following problems during mass production. Firstly, in every imprinting job, the substrate, the stamper, and the buffer sheet must be sequentially inserted and assembled, and removed in the reverse sequence. Therefore, a reduction in the cycle time is difficult and complex manipulation is required. Secondly, in the processes of assembling and removal, friction with the positioning pin generates dust which tends to produce transfer defects.

It is therefore an object of the present invention to provide an imprinting device which achieve a short cycle time and generates scarce transfer defects without requiring complex manipulation.

Further objects and advantages of the invention will be apparent from the following description of the invention.

SUMMARY OF THE INVENTION

In order to accomplish the above object, an imprinting device according to the present invention comprises a pair of upper and lower pressing structures that sandwiches a substrate having a resist layer preliminarily applied on a transfer target surface of the substrate, and that exerts transfer pressure in the direction of the transfer target surface to form a predetermined pattern of recesses and protrusions on the transfer target surface of the substrate. At least one of the pair of upper and lower pressing structures comprises: a stamper having the pattern of recesses and protrusions, the pattern being transferred to the transfer target surface of the substrate, and having an outer diameter larger than that of the substrate; a stamper support having a stamper-holding part that detachably holds an outer circumferential part of the stamper to the stamper support; and a buffer sheet that is disposed with the stamper so that the stamper is sandwiched between the substrate and the buffer sheet is disposed radially inside the stamper-holding part of the stamper support, and opposite the transfer target surface of the substrate.

When the substrate is composed of a magnetic disk having recording surfaces on both surfaces of the substrate, an imprinting device of the invention comprises a pair of upper and lower pressing structures that sandwiches a substrate having resist layers preliminarily applied on transfer target surfaces of the substrate, and exerts transfer pressure towards the transfer target surfaces to form a predetermined pattern of recesses and protrusions on the transfer target surfaces of the substrate. In this instance, the substrate comprises a magnetic disk having recording surfaces on both sides of the substrate; and the imprinting device comprises a fixed side pressing structure and a movable side pressing structure, the fixed side pressing structure comprising: a first stamper having a pattern of recesses and protrusions, the pattern being adapted to be transferred onto a first recording surface of the magnetic disk, and having a diameter larger than that of the magnetic disk; a fixed stamper support having a stamper-holding part that detachably holds an outer circumferential part of the first stamper; a first buffer sheet that is disposed with the first stamper so that the first stamper is sandwiched between the substrate and the first buffer sheet and is disposed inside the stamper-holding part of the fixed stamper support, opposite the first recording surface of the magnetic disk; and a first positioning member that is inserted through center holes of the magnetic disk, the first stamper, and the first buffer sheet for positioning the magnetic disk, the first stamper, and the first buffer sheet with respect to the fixed stamper support. The movable side pressing structure is arranged to be movable toward and away from the fixed side pressing structure and comprises: a second stamper having a pattern of recesses and protrusions, the pattern being adapted to be transferred onto a second recording surface of the magnetic disk, and having a diameter larger than that of the magnetic disk; a movable stamper support having a stamper-holding part that detachably holds an outer circumferential part of the second stamper; a second buffer sheet that sandwiches the second stamper between the substrate and the second buffer sheet and is disposed inside the stamper-holding part of the movable stamper support, opposing the second recording surface of the magnetic disk; and a second positioning member that is inserted through center holes of the second stamper and the second buffer sheet for positioning the second stamper and the second buffer sheet with respect to the movable stamper support.

In an imprinting device according to the invention, the buffer sheet is disposed radially inside the stamper-holding part intervening under the stamper. Consequently, the stamper held with the stamper holding part holds the buffer sheet in the radially inside of the stamper support.

In an imprinting device of the invention, the stamper and the buffer sheet are held with the stamper support only in the initial transferring position, and the following operations only are needed for installation and removal of the transfer target substrate. Therefore, the invention can provide an imprinting device which achieves a short cycle time and generates little nor no transfer defects without the need of complex manipulations or operations.

DETAILED DESCRIPTION OF PREFERRED EMBODIMENTS

The following description will be made for a transfer target substrate of a magnetic disk having recording surfaces on both sides of the substrate. The present invention, however, is not limited to this configuration but can be applied to other configurations including transfer to one surface of a substrate and a substrate shape other than a disk.

Figure 1:
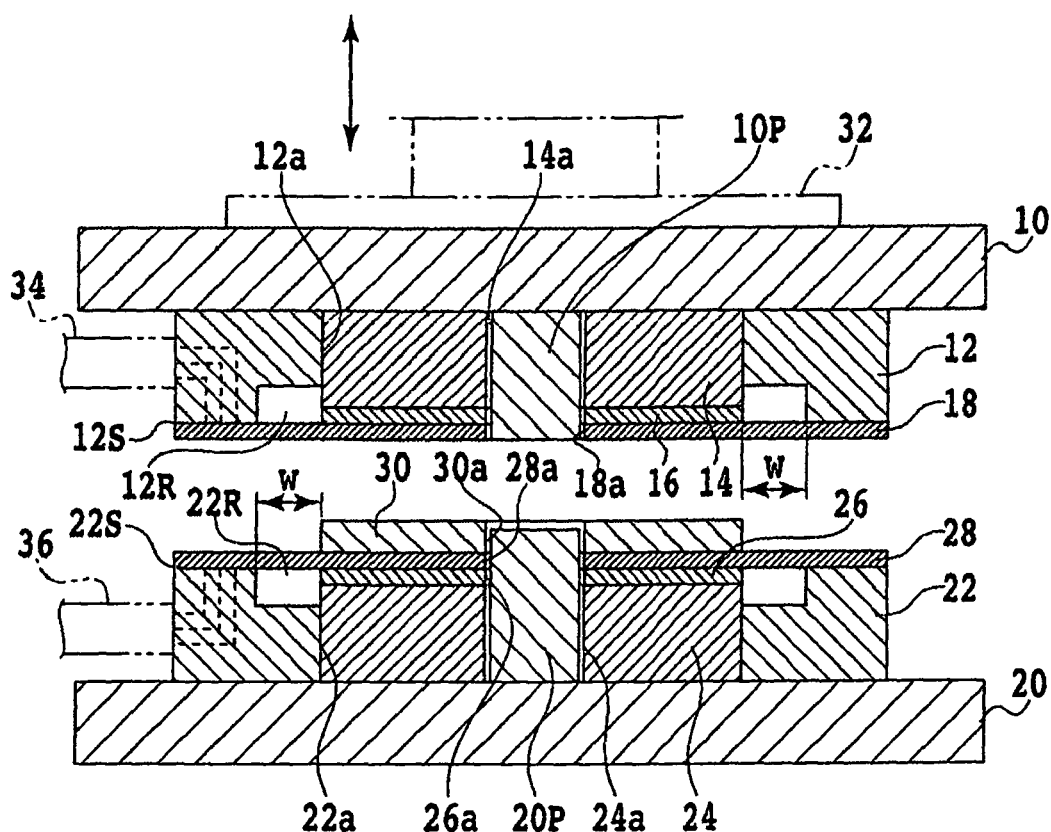
FIG. 1 is a sectional view of an essential part of an example of an imprinting device according to the invention.

FIG. 1 shows an essential part of an example of an imprinting device according to the invention.

Referring to FIG. 1, an imprinting device comprises a fixed side pressing structure that includes a fixed base plate 20, a fixed stamper support 22 being fixed on the fixed base plate 20 and having an attracting part that attracts a peripheral portion of a stamper 28 (described afterwards), and a pressure bearing body 24 disposed inside the fixed stamper support 22 and supporting a recording medium substrate 30 (a magnetic disk, a transfer target substrate) through the stamper 28 and a buffer sheet 26 (described hereinlater). The imprinting device also comprises a movable side pressing structure that includes a movable base plate 10, a movable stamper support 12 fixed on a movable base plate 10 and having an attracting part that attracts a peripheral portion of a stamper 18 (described hereinlater), and a pressure bearing body 14 disposed inside the movable stamper support 12 and pressing the recording medium substrate 30 through the stamper 18 and a buffer sheet 16.

Resist layers are formed on both surfaces of the recording medium substrate 30. A hole 30a is formed in the center of the recording medium substrate 30 for receiving a positioning pin 20P (described hereinlater).

The stamper 18 and the stamper 28 have a disk shape are formed of a flexible material such as nickel, merely by way of example. The stampers have a diameter larger than the outer diameter of the recording medium substrate 30 and a thickness of from 0.1 mm to 1.0 mm. A pattern of recesses and protrusions to be transferred to the surfaces of the substrate is formed on a surface around the hole 18a and the hole 28a in the centers of the stamper 18 and the stamper 28, respectively. The respective recesses and the protrusions in the patterns on the stamper 18 and the stamper 28 correspond to respective protrusions and recesses in the patterns on the resist layers formed on the both surfaces of the recording medium substrate 30.

On one surface of the fixed base plate 20, are secured the fixed stamper support 22 and the pressure bearing body 24 disposed inside the fixed stamper support 22.

A positioning pin 20P with a cylindrical shape, in this case monolithic or integral with the fixed base plate 20 and approximately perpendicular to the fixed base plate 20, is disposed in the hole 24a approximately at the center of the pressure bearing body 24. The central axis of the positioning pin 20P is common with the central axis of the hole 28a of the stamper 28. The length of projection of the positioning pin 20P from the one surface of the fixed base plate 20 is, as shown in FIG. 1, set so that the top position of the positioning pin 20P is a little lower than the top surface of the recording medium substrate 30 mounted on the stamper 28.

The fixed stamper support 22 with a hollow cylindrical shape has a round hole 22a in the central part thereof for accommodating the pressure bearing body 24. The central axis of the hole 22a is common with the central axis of the positioning pin 20P. Around the hole 22a, an s shoulder-like step or recess 22R with a ring or annular shape is formed concentrically with the hole 22a, as shown in FIG. 3.

The bottom wall surface of the recess 22R, which has a rectangular cross section in this instance, is perpendicular to the hole 22a. The bottom wall surface is approximately perpendicular to the wall surface that forms a circumferential surface of the recess 22R and is approximately normal to the central axis of the positioning pin 20P. The width W indicated in FIG. 1 of the ring shaped recess 22R in the radial direction is set at a dimension larger than about 10 times the thickness of the stamper 28 based on experimental result made by the inventor of the present invention. When a thickness of the stampers 18 and 28 is in the range of 0.1 mm to 1.0 mm, the width W of the recess can be in the range of 1.0 mm to 10.0 mm. A depth of the recess is determined depending on the imprinting pressure and, substances and dimensions of the materials used, and can be a value larger than about 0.3 mm, for example.

In the outer circumferential part of the fixed stamper support 22 outboard of the recess 22R, an attractive part 22S is formed on the top of the fixed stamper support 22 for securing a ring-shaped outer peripheral part of the stamper 28. The attractive part 22S, which is a stamper-holding part, has concentric circular grooves 22ga, 22gb, and 22gc, which as shown in FIG. 3, are connected to a vacuum pump or a suitable suction means (not shown in the figure). A radius of the groove 22ga is set at a value larger than radii of the grooves 22gb and 22gc; and a radius of the groove 22gc is set at a value smaller than the radii of the grooves 22ga and 22gb. The grooves 22ga, 22gb, and 22gc communicate with a suction line 36 which is connected to a vacuum pump.

Figure 3:
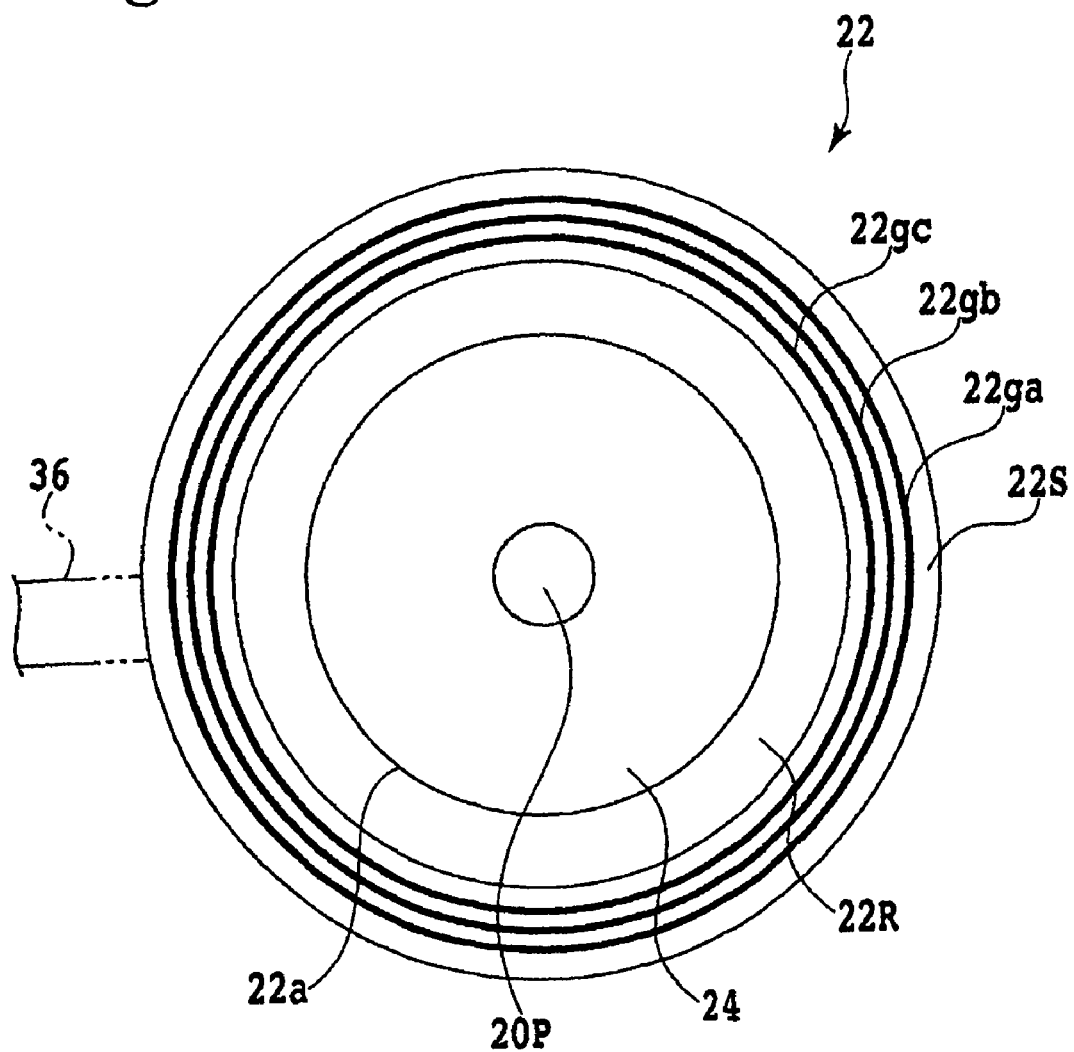
FIG. 3 is a plan view of the fixed stamper support of the example shown in FIG. 1.

Although only three grooves 22ga, 22gb, and 22gc are depicted in FIG. 3, the number of grooves is not limited to three but can be less than or greater than three.

The pressure bearing body 24 has a hole 24a in the center thereof for receiving the positioning pin 20P. A thickness of the pressure bearing body 24 is set so that the top surface of the buffer sheet 26 lies approximately in a common plane with the stamper-mounting plane of the attracting part 22S in the situation of the buffer sheet 26 mounted on the top surface of the pressure bearing body 24. In other words, a height of the top surface of the pressure bearing body 24 from the one surface of the fixed base plate 20 is smaller than the height of the top of the attractive part 22S from the fixed base plate 20 by the thickness of the buffer sheet 26. A material appropriate for use in the buffer sheet 26 can be a resin film having a modulus of elasticity sufficiently smaller than those of the stampers 18 and 28. Useful materials include polyimide, polyolefin, and fluorine resin.

On one surface of the movable base plate 10, are fixed a movable stamper support 12 (described afterwards) and a pressure bearing body 14 disposed inside the movable stamper support 12.

A connecting part 32 is connected to the other surface of the movable base plate 10, the connecting part 32 in turn being connected to a mechanism (not shown in the figure) for driving and controlling the movable base plate. In operation of the mechanism for driving and controlling the movable base plate, when the movable side pressing structure including the movable base plate 10 is driven and approaches the fixed side pressing structure including the fixed base plate 20, the stamper 18 becomes pressed in the manner shown in FIG. 2; and when the movable side pressing structure including the movable base plate 10 is driven away from the fixed side pressing structure including the fixed base plate 20, the stamper assumes a stand-by state, as shown in FIG. 1.

A positioning pin 10P with a cylindrical shape monolithic with the movable base plate 10 and approximately perpendicular to the movable base plate 10 is disposed in the hole 14a approximately at the center of the pressure bearing body 14. The central axis of the positioning pin 10P is common with the central axis of the hole 18a of the stamper 18 and the central axis of the positioning pin 20P. The length of projection of the positioning pin 10P from the one surface of the movable base plate 10 is set so that the tip of the positioning pin 10P reaches the surface of the stamper 18 facing the substrate 30, as shown in FIG. 1, the stamper 18 being attracted to the movable stamper support 12. Thus, the positioning pin 10P is provided on the movable base plate 10 independently of the positioning pin 20P provided on the fixed base plate 20. In this construction, the buffer sheet 16 and the stamper 18 are held on the movable base plate 10 independently of the buffer sheet 26 and the stamper 28 which are held on the fixed base plate 20.

The movable stamper support 12 with a hollow cylindrical shape has a round hole 12a in the central part thereof for accommodating the pressure bearing body 14. The central axis of the hole 12a is in common with the central axis of the positioning pin 102. Around the hole 12a, a sunk step 12R with a ring shape is formed concentrically with the hole 12a.

The bottom wall surface of the recess 12R having a rectangular cross section, is perpendicular to the hole 12a. The bottom wall surface is approximately perpendicular to the wall surface that forms a circumferential surface of the recess 12R and approximately parallel to the central axis of the positioning pin 102. The width W of the ring-shaped recess 12R in the radial direction shown in FIG. 1 is set at a dimension larger than about ten times the thickness of the stamper 18 based on experimental result made by the inventor of the present invention.

In the outer circumferential part of the movable stamper support 12 outer than the sunk step 12R, an attractive part 12S is formed on the tip of the movable stamper support 12 for mounting a ring-shaped outer peripheral part of the stamper 18. The attractive part 12S, which is a stamper-holding part, has concentric circular grooves (not shown in the figures) which are connected to a vacuum pump or suction means (not shown in the figure). The grooves communicate to an end of a suction line connecting to a vacuum pump.

The pressure bearing body 14 has a hole 14a in the central place thereof for inserting the positioning pin 102. A thickness of the pressure bearing body 14 is set so that the top surface of the buffer sheet 16 is approximately in a common plane with the stamper-mounting plane of the attracting part 12S in the state of the buffer sheet 16 mounted on the top surface of the pressure bearing body 14. In other words, a height of the top surface of the pressure bearing body 14 from the one surface of the movable base plate 10 is smaller than the height of the top of the attractive part 12S from the movable base plate 10 by the thickness of the buffer sheet 16. The buffer sheet 16 can be formed of the same material as that of the buffer sheet 26.

Figure 2:
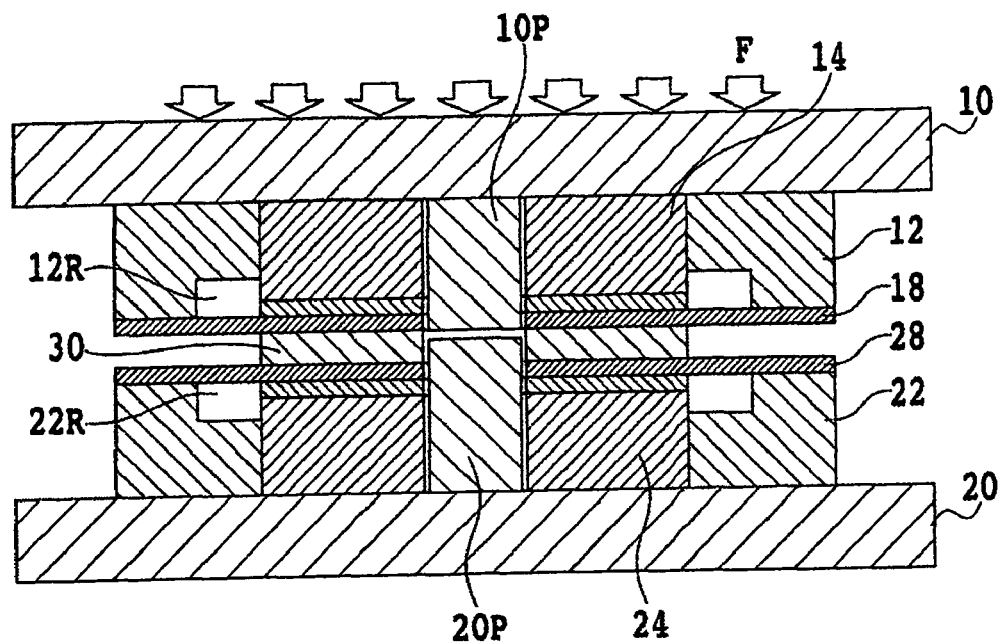
FIG. 2 is a sectional view illustrating an operation of the example shown in FIG. 1.

In operation of the imprinting device as described above and shown in FIG. 1, first, in the state wherein the movable side pressing structure is separated from the fixed side pressing structure, the vacuum pump is operated to attract and hold the stamper 18 and the stamper 28 to the movable stamper support 12 and the fixed stamper support 22, respectively. Then, the recording medium substrate 30 is put on the stamper 28 and subsequently, the mechanism for driving and controlling the movable base plate is operated to drive the movable side pressing structure approaching to the fixed side pressing structure, thereby pushing the stamper 18 towards the recording surface of the recording medium substrate 30 with a predetermined pressure F, as shown in FIG. 2.

Thus, the stampers 18 and 28 are pushed towards both surfaces of the recording medium substrate 30. As a result, the patterns on the stampers 18 and 28 are transferred on the both recording surfaces of the recording medium substrate 30.

Therefore, after the stampers 18 and 28 and the buffer sheets 16 and 26 are once held on the attracting part 12S of the movable stamper support 12 and the attractive part 22S of the fixed stamper support 22, further preparation operations on a new recording medium substrate 30 are limited to installation and removal of the recording medium substrate 30. Consequently, the cycle time for handling is substantially reduced via the use of an inexpensive handling technique. In addition, the friction on the stamper 18 and the buffer sheet 16 with the positioning pin 10P and the friction on the stamper 28 and the buffer sheet with the positioning pin 20P are suppressed, and the dust formation accompanying the friction is reduced. Therefore, transfer can be performed with little or no defects.

Figure 4:
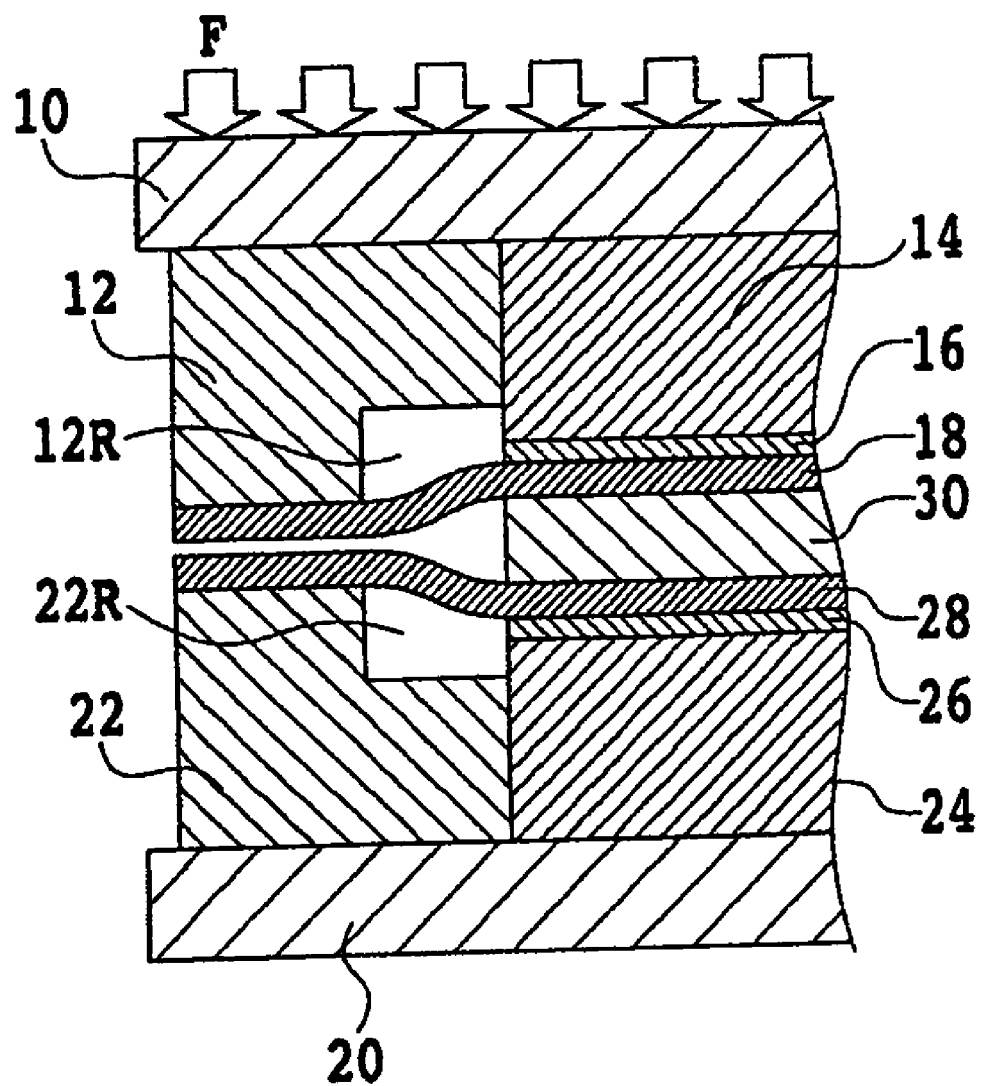
FIG. 4 is a partial sectional view illustrating another operation of the example shown in FIG. 1.

In the transfer process, a bending part is formed in the stampers 18 and 28 between the part thereof attracted by the attracting parts 12S and 22S of the stamper supports and the outer periphery of the recording medium substrate 30. However, the bending parts are not formed with a small radius of curvature, as shown in FIG. 4 owing to the recesses 12R and 22R formed in the stamper supports. Therefore, undesirable damage is suppressed in the stampers 18 and 28.

In the structure of the invention, an independent structure is formed between the movable stamper support 12 and the pressure bearing body 14, and between the fixed stamper support 22 and the pressure bearing body 24. Further the recesses 12R and 22R formed in the stamper supports are lower than the attracting parts generating no transfer pressure and have a sufficient depth to avoid attraction of the stampers 18 and 28. Therefore, stress concentration at the edge of the stampers 18 and 28 due to the pressing force is avoided thereby providing uniform transfer pressure. In addition, the impact of attraction on transfer performance is eliminated.

A means for holding the stamper is not limited to the suction by a vacuum pump as described above but, for example, can be a method using an adhesive that keeps adhesive ability in repeated use. Moreover, when the stamper is made of a magnetic material, an electromagnetic force can be utilized.

Figure 6:
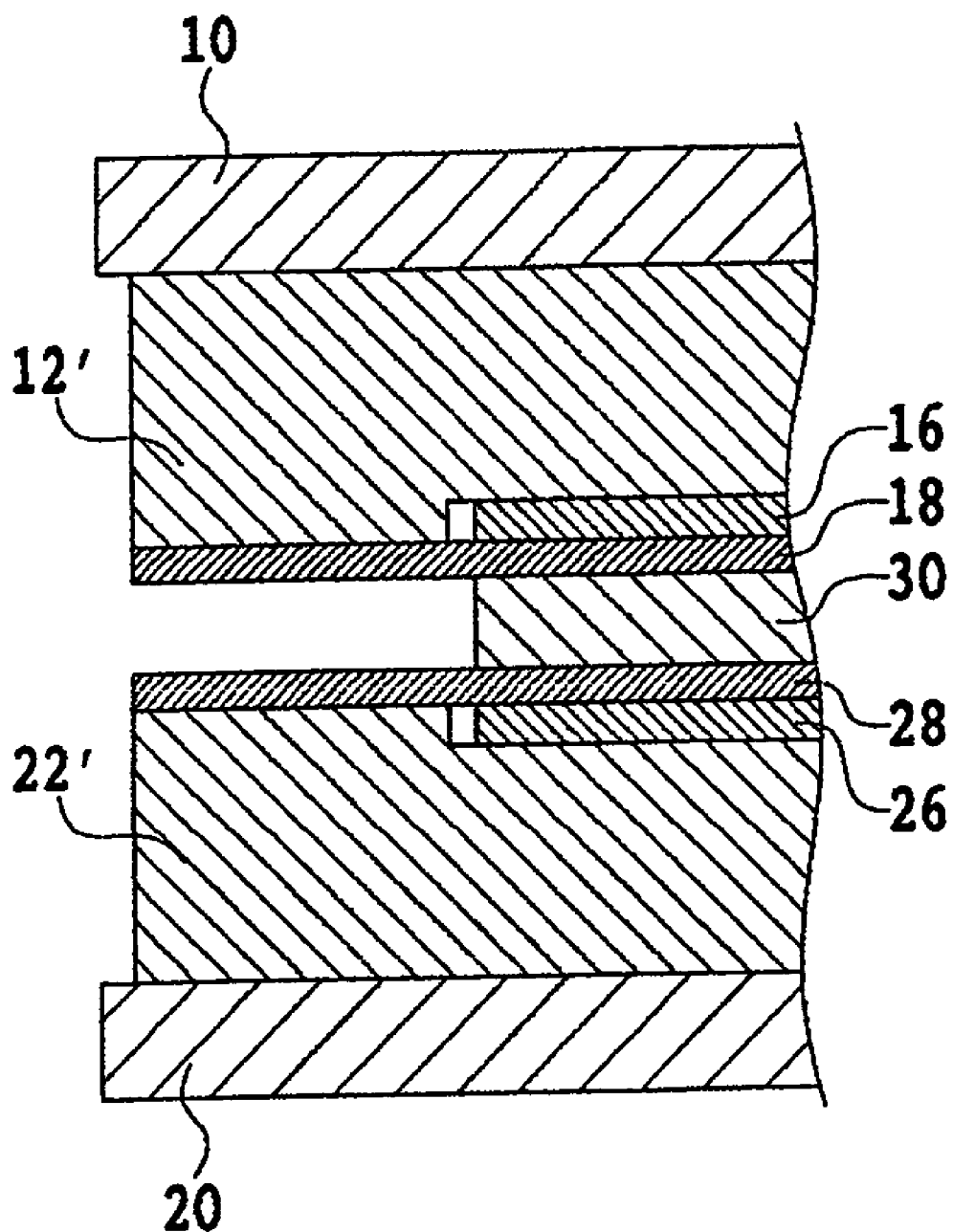
FIG. 6 is a partial sectional view showing a structure of a comparative device.

FIG. 6 shows a comparative example in which a recess such as the recesses 12R and 22R described above is not provided in the movable stamper support 12' and the fixed stamper support 22'. In FIG. 6, the structure elements similar to those in the example of FIG. 1 are given the same symbols and description thereon is omitted.

In the structure of FIG. 6, the movable stamper support 12' and the fixed stamper support 22' each includes monolithical parts corresponding to the pressure bearing body 14 or the pressure bearing body 24 in FIG. 1.

Figure 7:
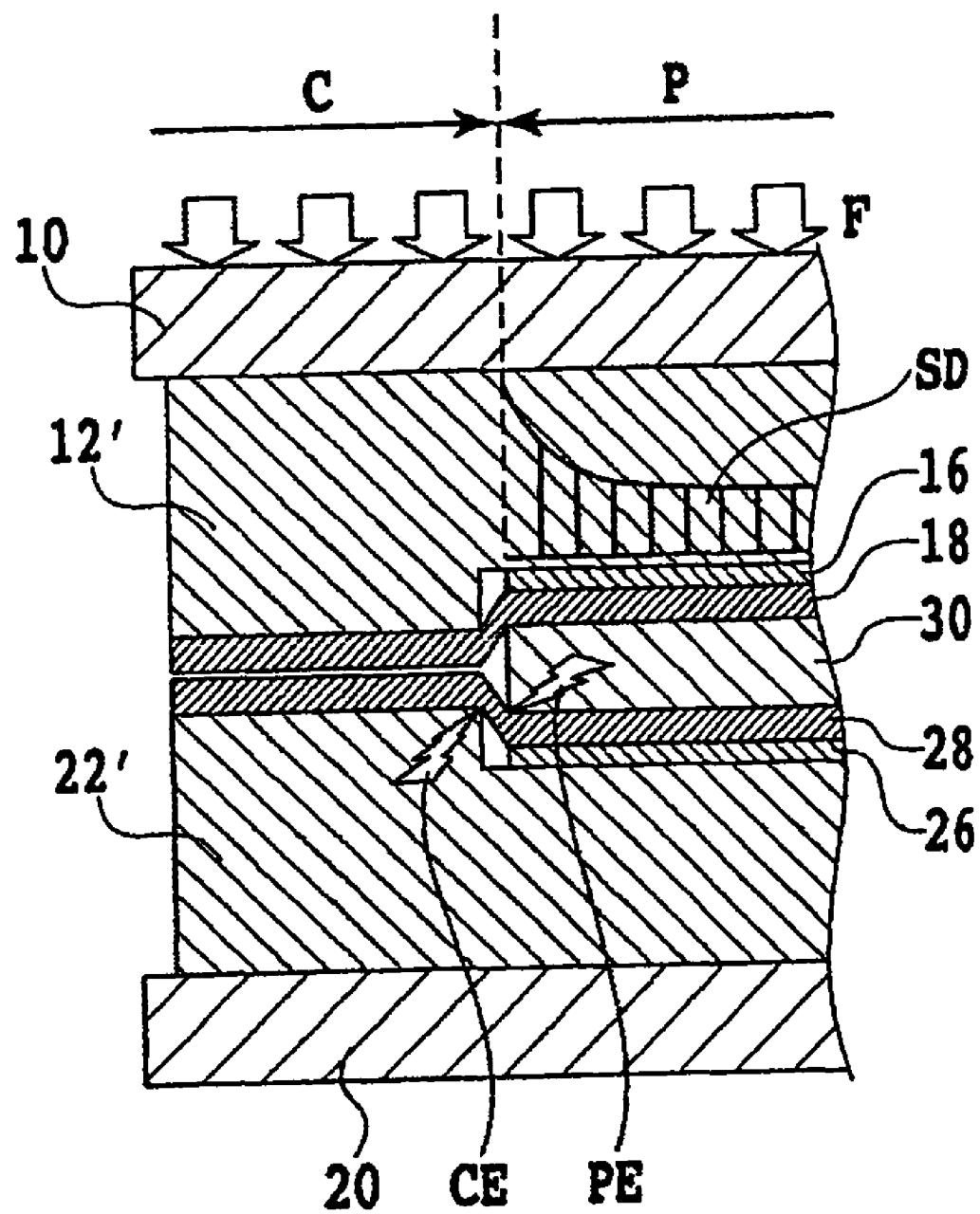
FIG. 7 is a partial sectional view for illustrating operation of the comparative device.

In this comparative example, when the movable side pressing structure is moved to the fixed side pressing structure as shown in FIG. 7, the stampers 18 and 28 are pulled by the attracting portion C since the contact pressing portion P of pressing the substrate is continuing to the attracting portion C in each of the movable stamper support 12' and the fixed stamper support 22'. As a result, stress concentration occurs at the edge PE of the contact pressing portion P and the edge CE of the attracting portion C. In this situation, the transferring pressure on the substrate 30 is extremely high at the edge of the substrate as shown by the pressure distribution curve SD. When the buffer sheets 16 and 26 with a low coefficient of elasticity are interposed, or the pressing force itself is large, the deformation of the contact pressing part P is large with respect to the attractive portion C. Consequently, steps are generated in the stampers 18 and 28 between the edge PE of the contact pressing portion P and the edge CE of the attractive portion C, and the stampers 18 and 28 are bent with a relatively small radius of curvature thus damaging the stampers.

Figure 5:
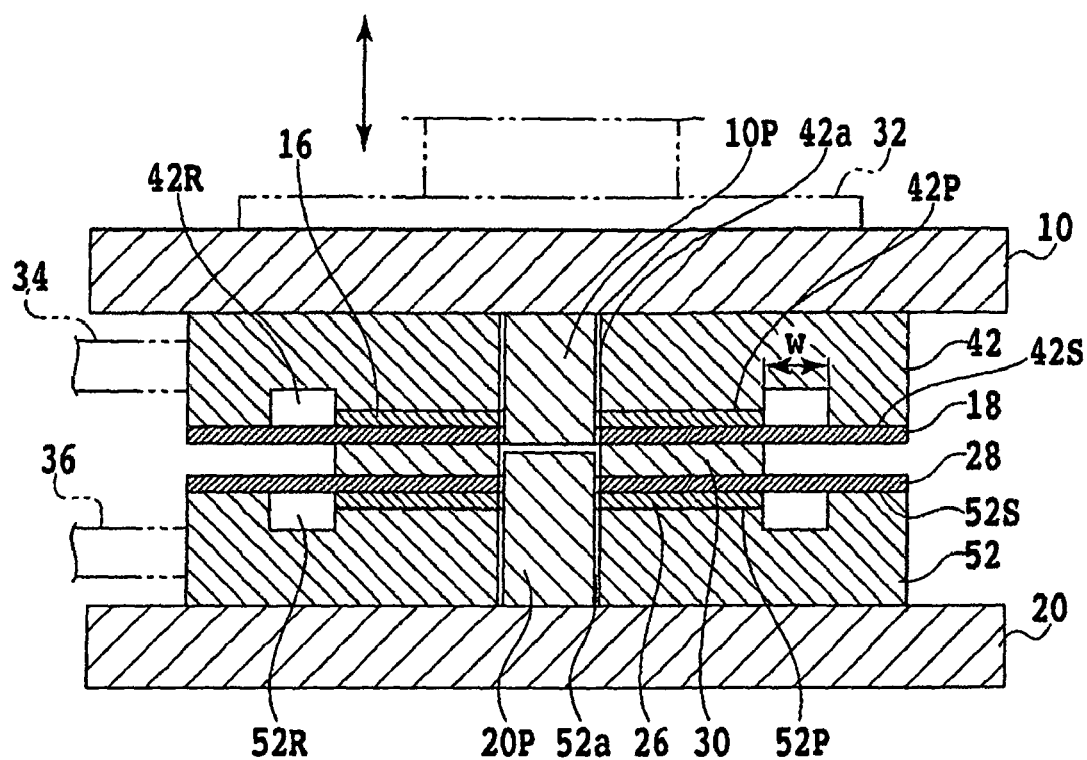
FIG. 5 is a sectional view of an essential part of another example of an imprinting device according to the invention.

FIG. 5 shows an essential part of another example of an imprinting device according to the invention.

In the example of FIG. 1, the movable stamper support 12, the pressure bearing body 14, the fixed stamper support 22, and the pressure bearing body 24 are all separate structures. In the example of FIG. 5, on the other hand, each of the movable stamper support 42 and the fixed stamper support 52 has a structure including a monolithic pressure bearing body.

In a case of high precision imprinting, that is, imprinting with highly uniform distribution of the imprinting pressure, high planar precision is required with the pressure bearing planes 52P and 42P. A monolithic structure as in the example of FIG. 5 has difficulty in machining the pressure bearing surface with a depression in an amount of the buffer sheet. Thus, the structure of FIG. 1 described previously is advantageous in this respect. Nevertheless, in a case a rather rough pressure distribution is allowed, a monolithic structure as per this example can reduce the number of steps of machining and assembling thereby reducing the cost of the device.

Meanwhile, in FIG. 5, the similar construction elements as those in the example of FIG. 1 are given the same symbols and description thereon is omitted.

The structures of the movable stamper support 42 and the fixed stamper support 52 are similar to each other. So, description is made only on the movable stamper support 42 and description on the fixed stamper support 52 is omitted.

The movable stamper support 42 with a hollow cylindrical shape has, in the center thereof, a round hole 42a for accommodating a positioning pin 102. The central axis of the hole 42a is in common with the central axis of the positioning pin 10P. A concentric ring shaped groove 42R is formed in the place of the movable stamper support 42 outer than the hole 42a.

The plane of the bottom wall surface of the groove 42R, which has a rectangular cross section, is perpendicular to the hole 42a. Inner and outer peripheral wall surfaces of the groove 42R, are approximately perpendicular to the bottom surface of the groove, and are formed approximately parallel to the central axis of the positioning pin 10P. The width W in the radial direction of the ring-shaped groove 42R indicated in FIG. 5 is set to a dimension at least ten times the thickness of the stamper 18 based on experimental results made by the inventor of the present invention. A depth of the groove 42R is set to a reasonable value in the same manner as the recess 12R in the example of FIG. 1.

In a location further outboard of the groove 42R in the movable stamper support 42, an attracting part 42S is formed on the top of the movable stamper support 42 for mounting a ring-shaped circumferential part of the stamper 18. The attracting part 42S has a plurality of concentric circular grooves (not shown in the figure) formed thereon which are connected to a vacuum pump or suction means (not shown). Each groove communicates with a suction line 34 connecting to the vacuum pump.

In operation of the imprinting device having this structure, first in the state of the movable side pressing structure separated from the fixed side pressing structure, the vacuum pump is activated, thereby attracting and holding the stampers and 28 to the movable stamper support 42 and the fixed stamper support 52, respectively. Then, the recording medium substrate 30 is put onto the stamper 28. Subsequently, a mechanism for driving and controlling the movable base plate is activated to drive the movable side pressing structure approaching towards the fixed side pressing structure, thereby pressing the recording surface of the recording medium substrate 30 with the stamper 18 with a predetermined pressure, as shown in FIG. 5.

As a result, the stampers 18 and 28 are pressed against both recording surfaces of the recording medium substrate 30 thereby transferring the patterns on the stampers 18 and 28 onto these recording surfaces of the recording medium substrate 30.

In this example also, after the stampers 18 and 28 and the buffer sheets 16 and 26 are once held on the attracting part 42S of the movable stamper support 42 and on the attracting part 52S of the fixed stamper support 52, respectively, the only operation necessary is the removal of the substrate after the imprinting operation and the disposition of a new recording medium substrate in its place. Therefore, a cycle time for handling is substantially reduced through the use of a rather simple and inexpensive handling technique. Moreover, friction due to sliding of the stampers 18 and 28, and the buffer sheets 16 and 26 relative to the positioning pins 10P and 20P, as well as generation of dust accompanying the sliding are suppressed, performing imprinting with rare or no defects.

In the transfer process in this example, a bending part is formed in the stampers 18 and 28 between the part thereof attracted by the attracting parts 42S and 52S of the stamper supports and the outer periphery of the recording medium substrate 30. However, the bending part is not formed with a small radius of curvature owing to the grooves 42R and 52R formed in the stamper supports. Therefore, undesirable damages are suppressed in the stampers 18 and 28.

The disclosure of Japanese Patent Application No. 2009-024096 filed on Feb. 4, 2009 is hereby incorporated by reference herein.

While the invention has been explained with reference to the specific embodiments of the invention, the explanation is illustrative and the invention is limited only by the appended claims.

What is claimed is:

1. An imprinting device comprising:
a pair of upper and lower pressing structures that sandwiches a substrate comprising a magnetic disk and having resist layers preliminarily applied on transfer target surfaces of the substrate, and exerts transfer pressure towards the transfer target surfaces to form a predetermined pattern of recesses and protrusions on the transfer target surfaces of the substrate, the upper and lower pressing structures comprising:
a fixed side pressing structure comprising:
a fixed base plate;
a first stamper having a pattern of recesses and protrusions, the pattern being configured to be transferred onto a first recording surface of the magnetic disk, the first stamper having a diameter larger than that of the magnetic disk;
a fixed stamper support having a stamper-holding part that detachably holds an outer circumferential part of the first stamper thereagainst;
a first buffer sheet disposed with the first stamper so that the first stamper is sandwiched between the substrate and the first buffer sheet, and the first buffer sheet is disposed inside the stamper-holding part and opposite the first recording surface of the magnetic disk; and
a first positioning member that is inserted through center holes of the magnetic disk, the first stamper and the first buffer sheet, for positioning the magnetic disk, the first stamper and the first buffer sheet with respect to the fixed stamper support; and
a movable side pressing structure disposed so as to be movable toward and away from the fixed side pressing structure, and comprising:
a movable base plate;
a second stamper having a pattern of recesses and protrusions, the pattern being transferred onto a second recording surface of the magnetic disk, and having a diameter larger than that of the magnetic disk;
a movable stamper support having a stamper-holding part that detachably holds an outer circumferential part of the second stamper thereagainst;
a second buffer sheet disposed with the second stamper so that the second stamper is sandwiched between the substrate and the second buffer sheet, and the second buffer sheet is disposed inside the stamper-holding part of the movable stamper support, and opposite the second recording surface of the magnetic disk; and
a second positioning member that is inserted through center holes of the second stamper and the second buffer sheet, for positioning the second stamper and the second buffer sheet with respect to the movable stamper support,
wherein the fixed stamper support has a first recess between a periphery of the first buffer sheet and the stamper-holding part of the fixed stamper support, the first recess facing the first stamper; and wherein the movable stamper support has a second recess between a periphery of the second buffer sheet and the stamper-holding part of the movable stamper support, the second recess facing the second stamper.

2. The imprinting device according to claim 1, wherein a width dimension along a radial direction of the first stamper which is exposed to the first recess in the fixed stamper support is at least ten times a thickness of the first stamper, and a width dimension along a radial direction of the second stamper which is exposed to the second recess in the movable stamper support is at least ten times a thickness of the second stamper.

3. An imprinting device comprising:
a pair of upper and lower pressing structures that sandwiches a substrate comprising a magnetic disk and having resist layers preliminarily applied on transfer target surfaces of the substrate, and exerts transfer pressure towards the transfer target surfaces to form a predetermined pattern of recesses and protrusions on the transfer target surfaces of the substrate, the upper and lower pressing structures comprising:
a fixed side pressing structure comprising:
a fixed base plate;
a first stamper having a pattern of recesses and protrusions, the pattern being configured to be transferred onto a first recording surface of the magnetic disk, the first stamper having a diameter larger than that of the magnetic disk;
a fixed stamper support having a stamper-holding part that detachably holds an outer circumferential part of the first stamper thereagainst;
a first buffer sheet disposed with the first stamper so that the first stamper is sandwiched between the substrate and the first buffer sheet, and the first buffer sheet is disposed inside the stamper-holding part and opposite the first recording surface of the magnetic disk; and
a first positioning member that is inserted through center holes of the magnetic disk, the first stamper and the first buffer sheet, for positioning the magnetic disk, the first stamper and the first buffer sheet with respect to the fixed stamper support; and
a movable side pressing structure disposed so as to be movable toward and away from the fixed side pressing structure, and comprising:
a movable base plate;
a second stamper having a pattern of recesses and protrusions, the pattern being transferred onto a second recording surface of the magnetic disk, and having a diameter larger than that of the magnetic disk;
a movable stamper support having a stamper-holding part that detachably holds an outer circumferential part of the second stamper thereagainst;
a second buffer sheet disposed with the second stamper so that the second stamper is sandwiched between the substrate and the second buffer sheet, and the second buffer sheet is disposed inside the stamper-holding part of the movable stamper support, and opposite the second recording surface of the magnetic disk; and
a second positioning member that is inserted through center holes of the second stamper and the second buffer sheet, for positioning the second stamper and the second buffer sheet with respect to the movable stamper support, wherein the fixed stamper support has a first pressure bearing body disposed inside the fixed stamper support, the first pressure bearing body being monolithic with or separated from the fixed stamper support and supporting the first stamper and the substrate through the first buffer sheet, and wherein the movable stamper support has a second pressure bearing body inside the movable stamper support, the second pressure bearing body being monolithic with or separated from the movable stamper support and supporting the second stamper through the second buffer sheet.

4. The imprinting device according to claim 3, wherein the fixed stamper support has a first recess between a periphery of the first pressure bearing body and the stamper-holding part of the fixed stamper support, and opposite the first stamper, and wherein the movable stamper support has a second recess between a periphery of the second pressure bearing body and the stamper-bearing part of the movable stamper support, and opposite the second stamper.

5. The imprinting device according to claim 4, wherein a width dimension along a radial direction of the first stamper exposed to the first recess in the fixed stamper support is at least ten times a thickness of the first stamper, and wherein a width dimension along a radial direction of the second stamper exposed to the second recess in the movable stamper support is at least ten times a thickness of the second stamper.

6. The imprinting device according to claim 1, wherein the stamper-holding parts of the fixed stamper support and the movable stamper support detachably hold the outer circumferential parts of the first stamper and the second stamper, respectively, by a suction force, an electromagnetic force, or an adhesive force.

* * * * *

UNITED STATES PATENT AND TRADEMARK OFFICE
CERTIFICATE OF CORRECTION

PATENT NO. : 8,182,258 B2
APPLICATION NO. : 12/656326
DATED : May 22, 2012
INVENTOR(S) : Tomonori Katano It is certified that error appears in the above-identified patent and that said Letters Patent is hereby corrected as shown below:

Change column 4, line 27, "A positioning pin 209 with a cylindrical shape," to --A positioning pin 20P with a cylindrical shape,--.

Change column 4, line 32, "pin 209 is common with the central axis" to --pin 20P is common with the central axis--.

Change column 4, line 34, "209 from the one surface" to --20P from the one surface--.

Change column 4, line 42, "positioning pin 202." to --positioning pin 20P.--.

Change column 4, line 50, "central axis of the positioning pin 202." to --central axis of the positioning pin 20P.--.

Change column 5, line 64, "positioning pin 102." to --positioning pin 10P.--.

Change column 6, line 4, "positioning pin 102." to --positioning pin 10P.--.

Change column 6, line 20, "place thereof for inserting the positioning pin 102." to --place thereof for inserting the positioning pin 10P.--.

Change column 8, line 13, "modating a positioning pin 102." to --modating a positioning pin 10P.--.

Change column 8, line 42, "thereby attracting and holding the stampers and" to --thereby attracting and holding the stampers 18 and--.

Signed and Sealed this
Eighteenth Day of September, 2012

David J. Kappos
*Director of the United States Patent and Trademark Office*